Oct. 3, 1933.  F. J. HOHNHORST ET AL  1,928,690
ADJUSTING MEANS FOR BEARINGS
Filed July 10, 1931  2 Sheets-Sheet 1

INVENTORS:
Ferdinand J. Hohnhorst
Ferdinand J. Kroeger

Oct. 3, 1933. F. J. HOHNHORST ET AL 1,928,690
ADJUSTING MEANS FOR BEARINGS
Filed July 10, 1931   2 Sheets-Sheet 2
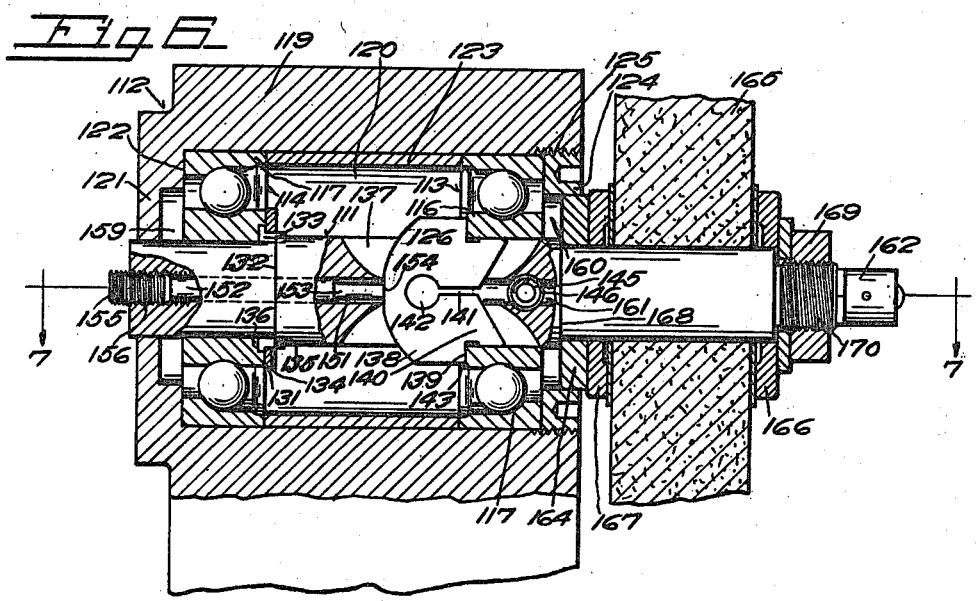
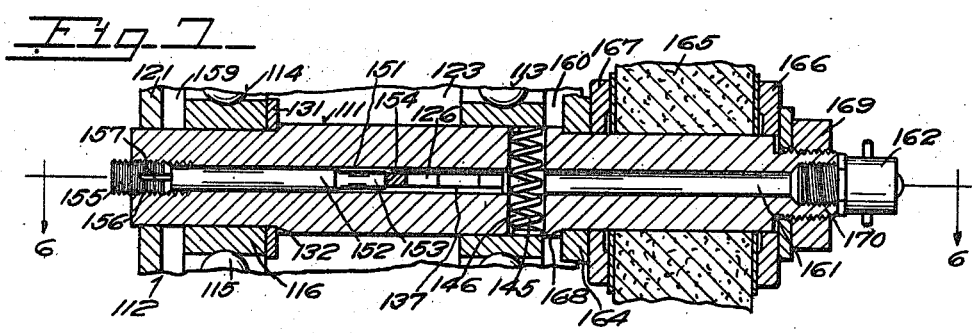
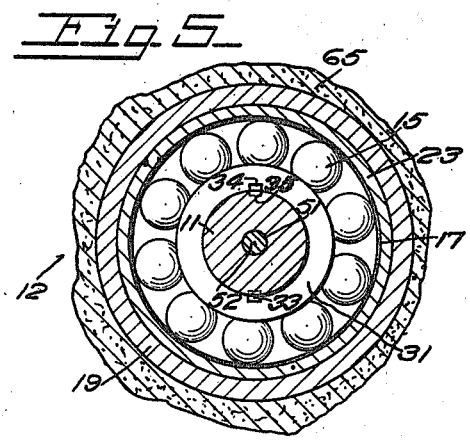
INVENTORS:
Ferdinand J. Hohnhorst
Ferdinand J. Kroeger,
by A. T. Herbst, Their Attorney Patented Oct. 3, 1933

1,928,690

UNITED STATES PATENT OFFICE 1,928,690

ADJUSTING MEANS FOR BEARINGS

Ferdinand J. Hohnhorst and Ferdinand J. Kroeger, Covington, Ky.

Application July 10, 1931. Serial No. 549,909

4 Claims. (Cl. 308—189)

Our invention relates to means for adjusting bearings comprising rotatable friction reducing members, such as balls and rollers.

It is the object of our invention to provide novel means for holding the raceway of such bearing to the arbor; further, to provide novel means whereby to adjust a raceway lengthwise of the bearing; further, to provide novel means whereby to adjust the axial distance between raceways for properly positioning the raceways relatively to each other in order to properly relate the raceways and the rotatable friction reducing members therebetween; and, further, to provide novel means whereby to adjust the distance between raceways of a plurality of bearings having coincident axes of rotation.

The invention will be further readily understood from the following description and claims, and from the drawings, in which latter:

Fig. 5 is a cross-section of the same, taken in the plane of the line 5—5 of Fig. 1, and partly broken away.

Fig. 6 is a central axial section of our improved device comprising a rotatable arbor, and taken on the line 6—6 of Fig. 7, and partly broken away; and, Fig. 7 is a central axial section of the same, taken on the line 7—7 of Fig. 6, and partly broken away.

Figure 1:
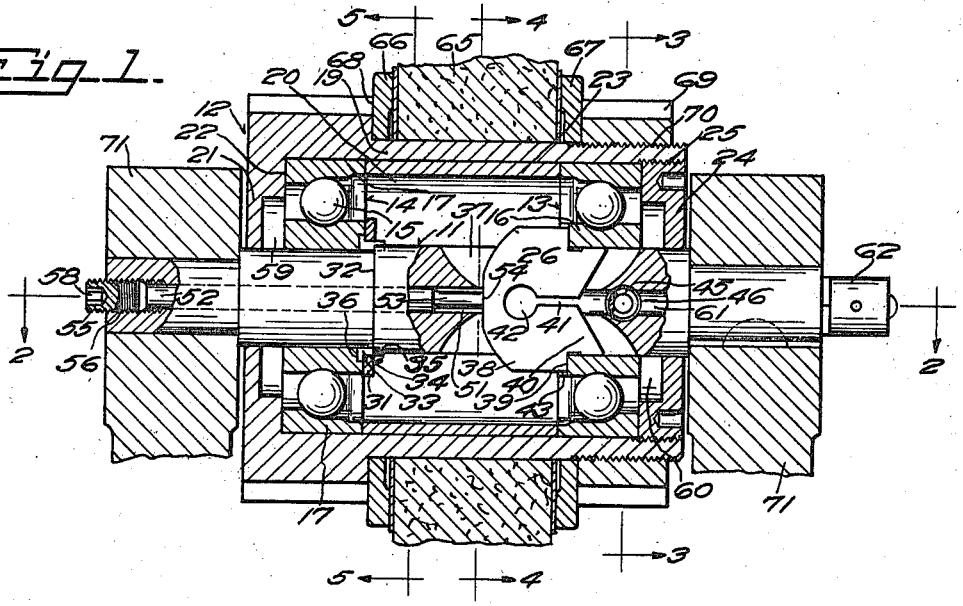
Fig. 1 is a central axial section of our improved device, taken in the plane of the line 1—1 of Fig. 2, and partly broken away, and exemplifying the arbor as non-rotating.

An arbor 11 has a member 12 thereabout. The arbor is shown as non-rotative and the member as rotative in the exemplification of our invention illustrated in Figs. 1 and 2, and the arbor 111 is exemplified as rotative and the member 112 thereabout as non-rotative in Figs. 6 and 7. The parts shown in Figs. 6 and 7, similar to parts shown in Figs. 1 to 5 inclusive, are designated by similar reference numerals raised to the series 100.

Bearings 13, 14, are exemplified about the arbor, these bearings including friction reducing members, which are exemplified as balls 15. The bearings include inner raceways 16 and outer raceways 17.

The member 12 includes a support 19, exemplified as a shell, having a cavity 20 in which ball bearings are located. The end wall 21 of this cavity has a shoulder 22 against which the outer raceway of the ball bearing 14 is received, a spacing collar 23 being located between the outer raceways of the respective bearings. An end wall 24 for the cavity has threaded connection 25 with the shell, for clamping the outer raceways and the spacing collar in the shell.

An end thrust member 26 is arranged to move one of the raceways endwise for adjusting the endwise relation between the raceways of the ball bearing. In the arrangement shown the distance between the inner raceways of the respective ball bearings is also adjusted. These adjustments provide for taking up wear between the raceways and the balls.

The arbor is provided with a collar 31, which is preferably held stationary to the arbor, or if desired, may be part of the arbor. It is shown positioned endwise by an annular shoulder 32 on the arbor. It is rotatively held to the arbor, as by a key 33 in a notch 34 in the collar and received in a notch 35 in the arbor. The inner raceway of the ball bearing 14 is preferably also non-rotative with relation to the arbor. It is shown provided with a notch 36 in which the key 33 is received.

The end thrust member 26 is shown as a key in a slot 37 in the arbor. The key 26 has wings 38 which extend to the outside of the arbor and have shoulders 39 arranged to exert an end thrust upon the inner raceway of the ball bearing 13. It is also provided with fingers 40 formed by a slot 41 and inner enlargement 42 thereof. These fingers are spring fingers and exert outward pressure upon the wall of the inner bore of the inner raceway for frictionally holding the inner raceway to prevent rotation between the inner raceway and the arbor, and to additionally steady said inner raceway.

The wings 38 may also be received in notches 43 in the inner raceway for definitely holding the inner raceway non-rotative with relation to the arbor.

A spring 45, shown as a spiral spring, is located in a hole 46 in the arbor. This spring is preferably a comparatively heavy spring and exerts very substantial end-wise pressure upon the inner raceway, which is received over the ends of the spring for compressing the spring. The spring holds the inner raceway non-rotative with relation to the arbor. In the form shown the spring exerts outward pressure at both of its ends against the wall of the bore of the inner raceway for frictionally holding the inner raceway to the arbor, permitting endwise adjustment of the inner raceway on the arbor.

The arbor is provided with a bore 51 in which there is a pin 52 which may have an inner reduced end 53. The inner end of the pin acts against an end thrust face 54 of the key for moving the key endwise. Endwise movement of the pin is shown accomplished by a screw 55 which has threaded connection 56 with the outer end of the wall of the bore. This provides a micrometer adjustment for the end thrust member.

The inner end of this screw is preferably split, as shown by the split 57, for spreading the inner end of the screw for frictionally holding the screw in adjusted positions in the threaded portion of the bore. The outer end of the screw is provided with a key socket 58 for receiving a suitable key for turning the screw and thereby adjusting the endwise position of the stem.

End spaces 59, 60, are located respectively between the inner raceway of the ball bearing 14 and the end wall 21 and between the inner raceway of the ball bearing 13 and the end wall 24.

The inner raceway of the bearing 14 is positioned endwise by the collar 31. The screw 55 moves the stem 52 and consequently the end thrust member 26 endwise away from the collar 31, and thereby moves the inner raceway of the bearing 13 endwise with relation to the outer raceway of said bearing, and away from the inner raceway of the bearing 14, thereby positioning the raceways correctly with relation to the rotatable friction reducing members between them, and taking up any wear between them, and definitely locating the raceways with relation to each other.

The bore 51 is preferably continued through the arbor, as at 61, for forming a lubricant passage for filling the cavity 20 with lubricant for lubricating the ball bearings. This bore is of greater diameter than the width of the key 26, the lubricant passing alongside said key in said bore.

The outer end of the arbor may have a suitable lubricant fitting 62 threaded therein and communicating with the bore 61, for supplying lubricant into the cavity by means of a suitable force feed device for the lubricant.

Our invention is especially useful in devices wherein the bearings are subjected to great strains and great wear, and wherein continued accuracy in the bearing is required, for instance as shown and described in our patents on mechanism for truing and dressing grinding wheels No. 1,803,062, dated April 28, 1931, and No. 1,526,496, dated February 17, 1925, in which abrading wheels are arranged to act on grinding wheels for truing and dressing the grinding wheels.

In Fig. 1 the abrading wheel is exemplified at 65, rotatable about a stationary arbor as in Patent No. 1,803,062, and in Fig. 6, the abrading wheel is exemplified at 165, rotatable with a rotatable arbor, as exemplified in Patent No. 1,526,496.

The abrading wheel 65 is shown clamped between washers 66, 67, the washers 66 abutting against an annular shoulder 68 of the shell 19, a nut 69 being threaded over the threaded end 70 of the shell for clamping the abrading wheel and the washers toward the shoulder 68.

The abrading wheel 165 is clamped to the arbor 111, washers 166, 167, being at the respective sides of the abrading wheel, a collar 164 abutting against a shoulder 168 on the arbor 111 forming an end abutment for the washer 167, a nut 169 being threaded over the threaded end 170 of the arbor for clamping the abrading wheel and the washers toward the shoulder 168.

The bearings of devices of this character are subjected to great wear, as they operate in the presence of abrasives, and the work performed by them must be accurately done, so that proper centering of the abrading wheels and proper rotation thereof in true annular paths must be maintained.

Our improved device provides especially efficient means for accomplishing these purposes in machines of this character and in other machines, and provides simple and efficient means for maintaining the raceways of ball bearings in proper relation and for taking up wear, and whereby delicate and accurate adjustments are obtained.

Figure 2:
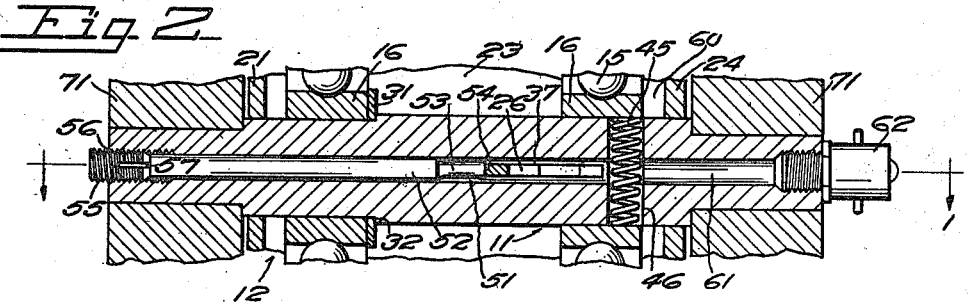
Fig. 2 is an axial section thereof, taken in the plane of the line 2—2 of Fig. 1, and partly broken away.
Figure 3:
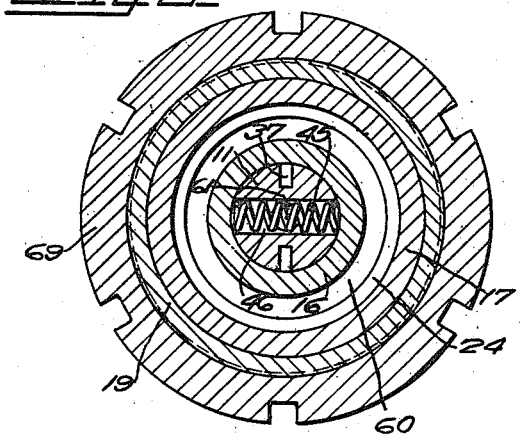
Fig. 3 is a cross-section thereof, taken in the plane of the line 3—3 of Fig. 1.
Figure 4:
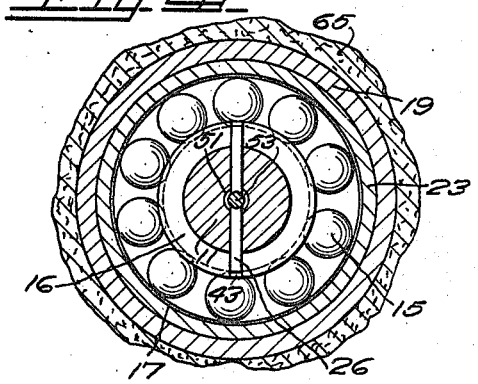
Fig. 4 is a cross-section of the same, taken in the plane of the line 4—4 of Fig. 1, and partly broken away.

In the exemplification shown in Figs. 1 and 2, the arbor is a stationary arbor and is suitably rigidly held in bearings 71, which may be part of a suitable holder or frame of a machine. These bearings may be clamp bearings as exemplified in the aforesaid Patent No. 1,803,062.

In the exemplification in Figs. 6 and 7, the arbor is rotatable, and has the rotatable element shown as the abrading wheel 165 thereon, as exemplified in the aforesaid Patent No. 1,526,496. The arbor rotates within a stationary shell 119, which may be part of a holder or suitable frame of a machine.

Having thus fully described our invention, what we claim as new, and desire to secure by Letters Patent, is:

1. In combination, an arbor, a member about said arbor, a bearing between said arbor and said member comprising an inner raceway, an outer raceway and rotatable friction reducing members between said raceways, said arbor provided with a lengthwise slot therethrough extending into said inner raceway, a fork in said slot provided with radially resilient parts in said inner raceway exerting outward pressure upon the inner periphery of said inner raceway, whereby to provide friction resistance between said fork and said inner raceway, a stem extending lengthwise in said arbor having operative connection with said fork for moving said fork in axial direction, and adjusting means for adjusting said stem lengthwise in said arbor whereby to adjust the lengthwise relation between said raceways.

2. In combination, an arbor, a member about said arbor, a friction reducing bearing between said arbor and said member comprising an inner raceway, an outer raceway and rotatable friction reducing members between said raceways, means operatively disposed between said arbor and said inner raceway comprising a spring transversely held in said arbor and positioned in said inner raceway and arranged for exerting outward pressure upon the inner periphery of said inner raceway whereby to frictionally hold said inner raceway to said arbor and an end thrust member between said arbor and said inner raceway, and means for adjusting said end thrust member endwise whereby to move said inner raceway endwise on said arbor resisted by said spring for adjusting the endwise relation between said raceways.

3. In combination, an arbor, a member about said arbor, a friction reducing bearing between said arbor and said member comprising an inner raceway, an outer raceway and rotatable friction reducing members between said raceways, said arbor provided with an endwise slot therethrough, a key in said slot provided with a wing extending outside said arbor and having operative connection with said inner raceway for causing combined rotation of said arbor and said inner raceway, said key provided with radially resilient fingers in said inner raceway exerting outward spring pressure upon the inner periphery of said inner raceway, and means extending endwise in said arbor having operative connection with said key for adjusting said key and said inner raceway endwise and thereby adjusting said friction reducing bearing.

4. In combination, an arbor, a member about said arbor, spaced apart friction reducing bearings between said arbor and said member comprising inner raceways, outer raceways and rotatable friction reducing members between said raceways, said arbor provided with a lengthwise slot therethrough, a key in said slot having end thrust connection with one of said spaced apart inner raceways, said key provided with radially resilient pressure exerting parts extending into said one of said inner raceways and arranged for exerting outward transverse pressure upon the inner periphery of said one of said inner raceways whereby to cause friction in axial direction between said key and said inner periphery, an axially movable stem in said arbor coincident with the lengthwise axis of said arbor, and screw adjusting means between said arbor and said stem for adjusting said stem axially in said arbor so as to adjust the distance between said spaced apart inner raceways.

FERDINAND J. HOHNHORST.
FERDINAND J. KROEGER.